(12) United States Patent
Mao-Cheia

(10) Patent No.: US 9,970,196 B1
(45) Date of Patent: May 15, 2018

(54) STAND-OFF BRACKET

(71) Applicant: Jose Teixeira Mao-Cheia, Port Elizabeth (ZA)

(72) Inventor: Jose Teixeira Mao-Cheia, Port Elizabeth (ZA)

(73) Assignee: Jose Teixeira Mao-Cheia, Humewood, Port Elizabeth (ZA)

( * ) Notice: Subject to any disclaimer, the term of this patent is extended or adjusted under 35 U.S.C. 154(b) by 0 days. days.

(21) Appl. No.: 15/553,412

(22) PCT Filed: Feb. 29, 2016

(86) PCT No.: PCT/IB2016/051104
§ 371 (c)(1),
(2) Date: Aug. 24, 2017

(87) PCT Pub. No.: WO2016/135710
PCT Pub. Date: Sep. 1, 2016

(30) Foreign Application Priority Data

Feb. 28, 2015 (ZA) .................................. 2015/00690

(51) Int. Cl.
*A47B 96/06* (2006.01)
*E04F 11/18* (2006.01)
*E04F 13/08* (2006.01)

(52) U.S. Cl.
CPC ...... *E04F 11/1812* (2013.01); *E04F 13/0837* (2013.01); *E04F 11/1853* (2013.01)

(58) Field of Classification Search
USPC ..................................................... 248/205.1
See application file for complete search history.

(56) References Cited

U.S. PATENT DOCUMENTS

| | | | | | |
|---|---|---|---|---|---|
| 4,717,301 | A | * | 1/1988 | Oddenino | B60R 13/0206 411/360 |
| 6,470,612 | B1 | * | 10/2002 | Pountney | F16B 5/02 40/607.13 |
| 6,632,056 | B1 | * | 10/2003 | Lind | E04F 13/0816 403/282 |
| 6,964,410 | B1 | * | 11/2005 | Hansen | E04F 11/1812 256/24 |
| 8,202,033 | B2 | * | 6/2012 | Choi | B62D 25/147 411/535 |
| 8,584,421 | B2 | * | 11/2013 | Norton | E04F 13/0853 24/458 |
| 8,628,049 | B2 | * | 1/2014 | Ghatikar | E04B 9/18 248/201 |
| 2006/0213954 | A1 | * | 9/2006 | Ruther | B21J 15/027 228/113 |
| 2012/0181402 | A1 | * | 7/2012 | Putz | F16B 5/0233 248/224.8 |

* cited by examiner

*Primary Examiner* — Monica E Millner
(74) *Attorney, Agent, or Firm* — Gable Gotwals

(57) ABSTRACT

This invention relates to a bracket including a barrel with a screw-threaded recess, a disk-shaped cap and a fastener that is receivable in the recess. The fastener is configured to attached the cap to the barrel in a spaced apart arrangement, when the fastener is received in the recess. The barrel comprises a body of polymeric material, a metal bush embedded in the body and defining the screw threaded recess, and a metal sleeve that extends partially around the periphery of the body.

17 Claims, 2 Drawing Sheets

STAND-OFF BRACKET

CROSS-REFERENCE TO RELATED APPLICATIONS

This application is the United States National Phase of Patent Application No. PCT/IB2016/051104 filed 29 Feb. 2016, which claims priority to South African Patent Application No. 2015/00690 filed 28 Feb. 2015, each of which is incorporated herein by reference.

FIELD OF THE INVENTION

This invention relates to stand-off brackets, which are devices for supporting panels that are spaced from supporting substrates, such as glass balustrades that are spaced from the adjacent floor, steps or the like. The invention is described below, with reference to stand-off brackets for glass balustrades, but its use is not limited to glass balustrades.

BACKGROUND OF THE INVENTION

A stand-off bracket typically comprises a cylindrical barrel that can be attached to a supporting substrate such as a floor, by screwing the barrel onto a threaded fastener that is partially embedded in the substrate, attaching the barrel to the substrate with screws, or the like. The stand-off bracket has a disc-shaped cap that can be attached to the barrel with a space between the barrel and the cap. A glass panel is placed adjacent the barrel and the cap is attached to the barrel with a fastener that passes through a hole in the glass panel, so that the glass panel is held in place relative to the barrel, by the cap and fastener.

Stand-off brackets are popular in the building industry for glass balustrades and other applications where glass or other panels are spaced from their supporting substrates largely due to the simplicity of their use and for their aesthetic appeal. However, the stand-off brackets need to be strong enough to withstand the loads that may be imposed on balustrades and, in light of the disastrous consequences failure of a balustrade can have, stand-off brackets need to be made with a significant margin of safety and in most countries, need to comply with rigorous safety standards. In order to meet these requirements and to meet the requirements of aesthetic appeal and durability, stand-off brackets are almost always machined from solid stainless steel and are polished after machining. The high cost of the stainless steel used, as well as the high machining and polishing costs cause the stand-off brackets to be very expensive.

The present invention seeks to provide a cost-effective, yet strong and appealing stand-off brackets.

SUMMARY OF THE INVENTION

According to the present invention there is provided a bracket comprising:
 a barrel defining an internally screw-threaded recess;
 a disk-shaped cap; and
a screw-threaded fastener, said fastener being at least partially receivable in the recess in screw-fashion and said fastener being configured to attach the cap to the barrel in a spaced apart arrangement, when the fastener is received in the recess;
wherein the barrel comprises a body of polymeric material; a metal bush defining the internally screw threaded recess, said bush being embedded in the body; and a metal sleeve that extends partially around the periphery of the body.

The cap may include a sheet metal shell and the fastener may be configured to urge the shell towards the barrel, when the fastener is received in the recess, the cap further including a cap body of polymeric material, said cap body being disposed between the shell and the barrel. The cap body may protrude from the shell in the direction of the barrel.

The word "barrel" is used herein to refer to the function which the barrel performs in the stand-off bracket and it does not refer to the shape of the barrel and the barrel need not necessarily have a cylindrically shape. Similarly, the word "disk-shaped" refers to the proportions of the cap, i.e. the ratios between its dimensions in different directions and the term "disk-shaped" is not limited to a circular or cylindrical outline.

The body may include a flange that defines a generally planar face, said flange extending between the face and the sleeve and said flange extending between the face and the bush, with an aperture in the flange that is in register with the recess in the bush.

The recess in the bush and the aperture in the flange may form a passage that extends through the barrel.

The bush and the sleeve may be attached to the body with a press fit.

The body may define one or more internal cavities and may include webs extending between the bush and the sleeve.

The sleeve may be cylindrically shaped and may comprise a length of pipe. The cap may have a circular outline and may have a diameter generally equal to the outer diameter of the sleeve.

The invention extends to a barrel for a stand-off bracket, said barrel being substantially as described above.

BRIEF DESCRIPTION OF THE DRAWINGS

For a better understanding of the present invention, and to show how it may be effected, the invention will now be described by way of non-limiting example, with reference to the accompanying drawings in which.

DETAILED DESCRIPTION OF THE DRAWINGS

Figure 1:
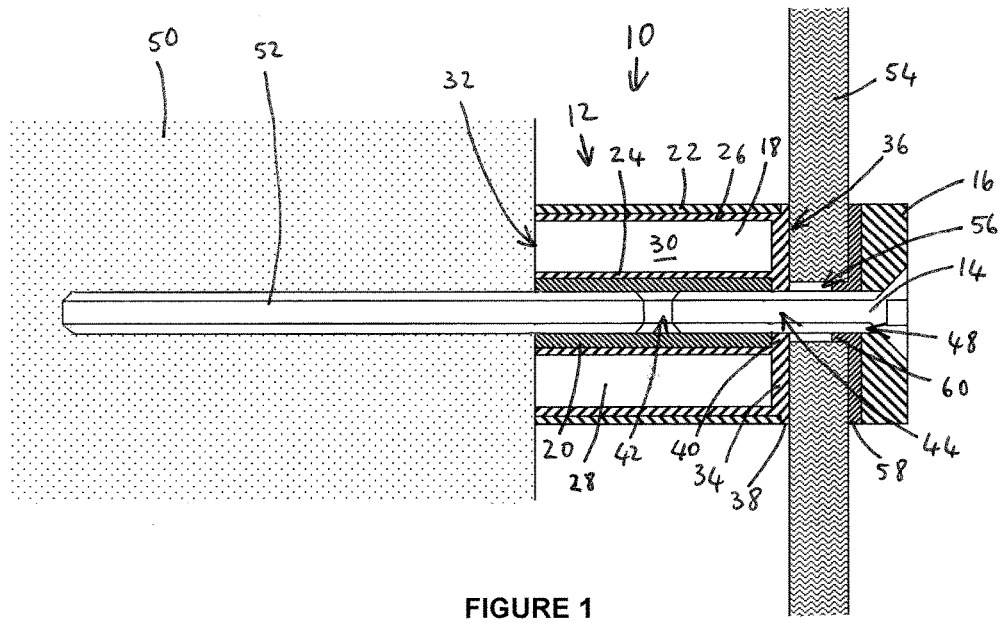
FIG. 1 shows a sectional assembly view of a first embodiment of a stand-off bracket according to the present invention, in use, supporting a glass panel in a spaced arrangement relative to a substrate.

Referring to the drawings, a stand-off bracket according to the present invention is generally identified by reference number 10. The stand-off bracket 10 includes a barrel, generally identified by reference number 12, a screw-threaded fastener in the form of a countersunk screw 14, and a solid, disk-shaped cap 16. Features that are common between the two embodiments of the invention shown in FIGS. 1 and 3, respectively, are identified by the same reference numbers.

Figure 2:
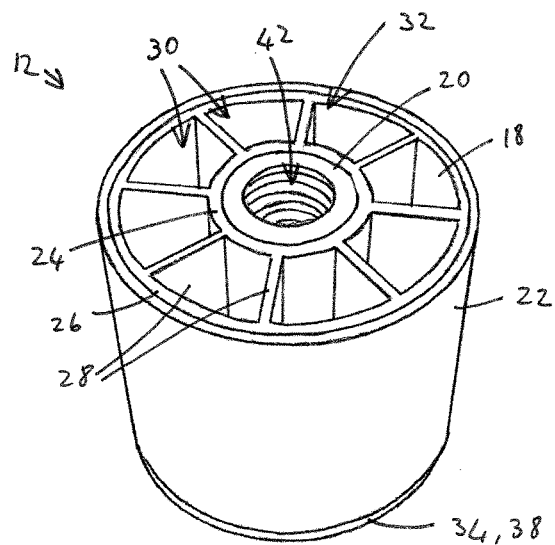
FIG. 2 shows a rear perspective view of a barrel of the stand-off bracket of FIG. 1.

Referring to FIGS. 1 and 2, the barrel 12 comprises a body 18 that is preferably moulded from a polymeric material such as nylon or any other suitably strong polymer, with a metal bush 20 embedded in the body and a metal sleeve 22 extending almost entirely around the periphery of the body. Other polymeric materials, such as elastomers or composites can be used for the body 18, although nylon has been found to be a suitable example material.

The sleeve 22 can have any desired shape, e.g. a rectangular or square cross-sectional profile, but in the illustrated embodiment, the sleeve is cylindrically shaped and comprises a length of stainless steel pipe or tubing. The sleeve 22 preferably has a relatively thin wall, relative to its size, e.g. the sleeve can have a wall thickness of 0.8 mm and a nominal diameter of 50 mm. The sleeve 22 can easily be polished in a cost effective, automated process, before being cut to length and being fitted on the body 18 which is preferably done by pressing the body into the sleeve with an interference fit (or "press fit"). Alternatively, the body 18 can be moulded inside the sleeve 22, or other assembly methods can be used.

The body 18 can be solid, can be composite with different parts embedded in it, can include internal cavities, or the like and in the preferred, illustrated embodiment, the body includes an inner cylindrical wall 24 extending around the bush 20, an outer cylindrical wall 26 that extends immediately inside the sleeve 22 and eight radial webs 28 extending between the inner and outer cylindrical walls, with cavities 30 between the webs, that are open at the rear 32 of the barrel 12. The body 18 also defines a flange 34 at its front, with a generally planar front face 36 and the flange includes an external circumferential shoulder 38 that extends between the face and the sleeve 22, as well as an internal circumferential shoulder 40 that extends between the face and the bush 20. The internal shoulder 40 is preferably thicker than the external shoulder 38.

The bush 20 is preferably machined from stainless steel or other suitably durable material and includes an internally screw-threaded aperture or passage 42 that extends along its entire length, from the rear 32 of the barrel 12 to the rear of the internal shoulder 40. The passage 42 thus forms a screw-threaded recess extending from the font face, but in the preferred embodiment, the "recess" is not a blind recess, but instead extends through the body 18 in the form of a passage 42. An aperture 44 is defined in the flange 34 and is in register with the passage 42 in the bush 20, so that the aperture and passage extend longitudinally through the entire barrel 12. The bush 20 is fitted inside the body 18 by inserting it into the inner cylindrical wall 24 with a press fit and since it is entirely embedded inside the body and is not visible in use, the bush need not be polished or finished and markings resulting from machining operations need not be removed. Alternatively, the body 18 can be moulded around the bush 20, or other assembly methods can be used The cap 16 can have any shape or appearance, but in the preferred embodiment shown in FIG. 1, it has a circular outline with a diameter that is generally equal to the outer diameter of the sleeve 22 and it defines a counter-sunk central aperture 48. The shank of the screw 14 can pass through the aperture 48 and can be screwed into the screw-thread of the bush 20, with the head of the screw received in the countersunk aperture 48, so that it is flush with the outside of the cap 16.

In use, the barrel 12 is attached to a substrate with a fastener. In the illustrated embodiment, the fastener is a threaded bar 52 that is partially embedded in a concrete substrate 50, but various alternatives are possible, e.g. the rod 52 may be fixed in the substrate with a suitable cement (e.g. epoxy), the fastener may be a combination screw with a threaded end (similar to the threaded rod 52) and a self tapping end that can be screwed into a timber substrate, a rawl plug, or the like. The barrel 12 is attached to the threaded bar 52 (or other suitable fastener) by screwing the free end of the bar 52 into the passage 42 until the rear 32 of the barrel butts against the substrate 50.

Once the barrel 12 is attached to the substrate 50, the glass panel 54 that needs to be supported by the bracket 10, is positioned with its one surface against the face 36 and with an aperture 54 in the glass, aligned with the aperture 44 and passage 42. A flexible washer 58 (e.g. one made of soft rubber) is positioned against the glass panel 54, opposite from the barrel 12 and the washer preferably has a shoulder 60 that extends partly into the aperture 56. The cap 16 is positioned against the washer 58 and the screw 14 is inserted through the apertures 48, 56 and 44 (in the cap, glass panel 54, and flange 34, respectively) and the washer and the screw is screwed into the screw-thread of the passage 42, until it presses the cap, washer and glass panel tightly against the barrel 12.

Figure 3:
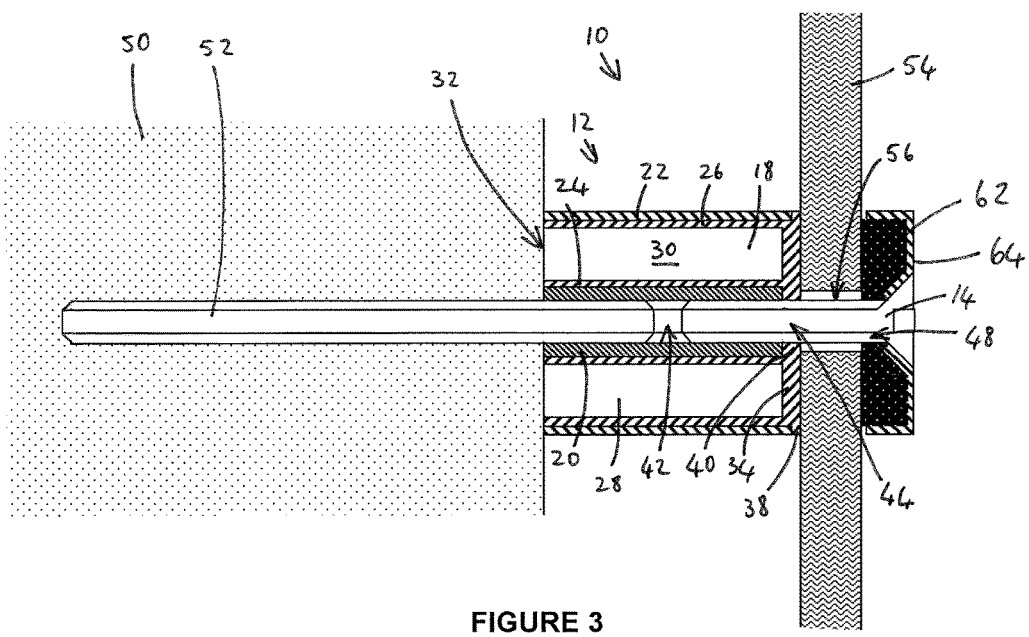
FIG. 3 shows a sectional assembly view of a second embodiment of a stand-off bracket according to the present invention, in use, supporting a glass panel in a space arrangement relative to a substrate.

Referring to FIG. 3, in a second embodiment of the invention, instead of being machined from solid stainless steel, the cap 16 comprises a cap body 62 that is moulded from a polymeric material such as nylon or other suitably strong polymer, with a stainless steel shell 64 of sheet metal that extends around the nylon body, in part. Preferably, the shell 64 is pressed from stainless steel plate, e.g. with a thickness of 1.5 mm and the pressing (or other forming processes) as well as subsequent polishing can be automated.

The external shape and size of the cap 16 is generally the same as the solid cap 16 shown in FIG. 1, including the countersunk aperture 48. However, the shell 64 preferably does not extend completely around the circumference of the cap body 62 and instead, the cap body protrudes from the shell, towards the barrel 12. The protruding cap body 62 can serve a similar purpose to the washer 58 shown in FIG. 1, to distribute compressive forces between the cap 16 and the glass panel 54, so that the washer can be omitted in the second embodiment of the invention.

Referring to all the drawings, the bracket 10 is used in the same way as a conventional stand-off bracket and has the same structural integrity, durability, corrosion resistance, aesthetic appeal, and all other advantages of a bracket with a solid stainless steel barrel. However, the bracket 10 is substantially less costly to produce, partly as a result of the reduced mass of stainless steel required in manufacturing the barrel 12 and partly because of the lower cost incurred in machining and finishing the metal parts of the barrel 12. The existence of the flange 34 also obviates the use of a washer between the glass panel 54 and barrel 12—that would be required when using a solid metal barrel.

The second embodiment of the cap 16 shown in FIG. 3, with a polymeric (nylon) cap body 62 and a metal (stainless steel) shell 64 on its outside, holds the same advantages as the solid cap 16 shown in FIG. 1, but in addition, it is more cost effective because of the lower mass of stainless steel required. Further, the polymeric body is sufficiently rigid to perform the function of holding the glass panel 54 in place during normal use, but in cases of excessive loading of the glass panel (e.g. excessive bending loads on the glass that are typically mimicked in destructive testing), the nylon body allows the cap to deform slightly under load and this deformation assists in alleviating stress concentrations on the glass and thus reduces the risk of the glass fracturing.

Further, the cost of high quality, corrosion resistant metals such as stainless steel, has motivated the use of stand-off brackets of ever-decreasing size, to reduce material costs. However, the cost savings resulting from the present invention allows stand-off brackets to be made cost-effectively with large diameters and the increase in diameters holds advantages of better distribution of bending stresses (and thus a reduced risk of fracturing glass panels during bending) and more aesthetic appeal. In addition, using larger diameter stand-off brackets 10 allows larger fasteners 14 to be used and larger holes 56 to be cut in the glass panels 54 and these larger components are far easier to install, with a far lower risk of errors.

The invention claimed is:

1. A bracket comprising:
   a barrel defining an internally screw-threaded recess;
   a disk-shaped cap; and
   a screw-threaded fastener, being at least partially receivable in the internally screw-threaded recess in screw-fashion and being configured to attach the disk-shaped cap to the barrel in a spaced apart arrangement, when the screw-threaded fastener is received in the screw-threaded recess;
   wherein said barrel comprising a body of polymeric material; a metal bush defining the internally screw threaded recess, said bush being embedded in the body; and a metal sleeve that extends partially around the periphery of the body.

2. The bracket according to claim 1, wherein the disk-shaped cap includes a sheet metal shell, said screw-threaded fastener being configured to urge the sheet metal shell towards the barrel when the screw-threaded fastener is received in the internally screw-threaded recess, and said disk-shaped cap further including a cap body of polymeric material, said cap body being disposed between the sheet metal shell and the barrel.

3. The bracket according to claim 2, wherein said cap body protrudes from the sheet metal shell in the direction of the barrel.

4. The bracket according to, claim 1, wherein the body includes a flange that defines a generally planar face, said flange extending between the planar face and the metal sleeve and said flange extending between the planar face and the bush, with an aperture in the flange that is in register with the internally screw-threaded recess in the metal bush.

5. The bracket according to claim 4, wherein the internally screw-threaded recess in the metal bush and the aperture in the flange form a passage that extends through the barrel.

6. The bracket according to claim 1, wherein the metal bush and the metal sleeve are attached to the body with a press fit.

7. The bracket according to claim 1, wherein the body defines one or more internal cavities.

8. The bracket according to claim 7, wherein the body includes webs extending between the metal bush and the metal sleeve.

9. The bracket according to claim 1, wherein the metal sleeve is cylindrically shaped and comprises a length of pipe.

10. The bracket according to claim 9, wherein the disked-shaped cap has a circular outline and has a diameter generally equal to an outer diameter of the metal sleeve.

11. A barrel for a stand-off bracket, said barrel defining an internally screw-threaded recess in which a screw-threaded fastener is at least partially receivable in screw-fashion, wherein the barrel comprises a body of polymeric material; a metal bush defining the internally screw threaded recess, said metal bush being embedded in the body; and a metal sleeve that extends partially around the periphery of the body.

12. The barrel according to claim 11, wherein the body includes a flange that defines a generally planar face, said flange extending between the planar face and the metal sleeve and said flange extending between the planar face and the metal bush, with an aperture in the flange that is in register with the internally screw-threaded recess in the metal bush.

13. The barrel according to claim 12, wherein the internally screw-threaded recess in the metal bush and the aperture in the flange form a passage that extends through the barrel.

14. The barrel according to claim 11, wherein the metal bush and the metal sleeve are attached to the body with a press fit.

15. The barrel according to claim 11, wherein the body defines one or more internal cavities.

16. The barrel according to claim 15, wherein the body includes webs extending between the metal bush and the metal sleeve.

17. The barrel according to claim 11, wherein the metal sleeve is cylindrically shaped and comprises a length of pipe.

\* \* \* \* \*